(12) United States Patent
Zoutman

(10) Patent No.: US 10,323,792 B2
(45) Date of Patent: Jun. 18, 2019

(54) RAIL POST VERTICAL EXTENSION SYSTEM

(71) Applicant: Ryan Zoutman, Drumheller (CA)

(72) Inventor: Ryan Zoutman, Drumheller (CA)

( * ) Notice: Subject to any disclaimer, the term of this patent is extended or adjusted under 35 U.S.C. 154(b) by 0 days.

(21) Appl. No.: 15/953,145

(22) Filed: Apr. 13, 2018

(65) Prior Publication Data
US 2018/0231180 A1     Aug. 16, 2018

Related U.S. Application Data

(63) Continuation-in-part of application No. 14/985,409, filed on Dec. 31, 2015, now abandoned.

(51) Int. Cl.
| | | |
|---|---|---|
| F16M 13/02 | (2006.01) | |
| A01G 9/12 | (2006.01) | |
| A01K 39/01 | (2006.01) | |
| A47G 7/04 | (2006.01) | |
| A01K 5/00 | (2006.01) | |
| F21V 33/00 | (2006.01) | |
| F21V 21/116 | (2006.01) | |
| E04H 12/22 | (2006.01) | |
| A01K 3/00 | (2006.01) | |
| E04H 17/08 | (2006.01) | |
| E04H 17/22 | (2006.01) | |

(52) U.S. Cl.
CPC ............. *F16M 13/025* (2013.01); *A01G 9/12* (2013.01); *A01K 3/00* (2013.01); *A01K 5/00* (2013.01); *A01K 39/01* (2013.01); *A47G 7/045* (2013.01); *E04H 12/2269* (2013.01); *F21V 21/116* (2013.01); *F21V 33/00* (2013.01); *E04H 17/08* (2013.01); *E04H 17/22* (2013.01)

(58) Field of Classification Search
CPC .............. A01G 9/12; G09F 2017/0066; G09F 2017/0041; A01K 39/01; A01K 5/00; F21V 21/108; A47G 7/04; E04H 15/54
USPC .......................... 248/530, 539, 518, 158, 156
See application file for complete search history.

(56) References Cited

U.S. PATENT DOCUMENTS

| | | | | |
|---|---|---|---|---|
| 1,281,062 A | * | 10/1918 | Norvell .............. | A47G 29/1216 232/39 |
| 1,767,585 A | * | 6/1930 | Hebendahl .............. | F21V 37/00 248/219.3 |
| 2,738,941 A | * | 3/1956 | Laurich .............. | A47G 29/1216 248/145 |
| 2,764,830 A | * | 10/1956 | Frey ........................ | G09F 17/00 116/63 R |

(Continued)

*Primary Examiner* — Stanton L Krycinski
(74) *Attorney, Agent, or Firm* — MBM Intellectual Property Law LLP

(57) ABSTRACT

A rail post mounting device/vertical extension systems for a deck, patio boundary or fence rail posts to alter the appearance of the posts by suspending plants in a structurally sturdy manner. The mounting device is configured to be inserted into a hollow fence post defining a chamber, and comprises a cover member having a top surface configured to hold one or more accessory items, and a bottom surface configured to engage the top of the hollow fence post, and an elongated insert member attached to the bottom surface of the cover member, which is configured for insertion into the post chamber. The elongated insert member also comprises a plurality of resilient retention arms configured to extend toward and pressingly engage with sidewalls of the post chamber.

10 Claims, 8 Drawing Sheets

(56) References Cited

U.S. PATENT DOCUMENTS

| | | | | |
|---|---|---|---|---|
| 3,015,024 | A | * | 12/1961 | Charchan .................. A01G 9/12 174/38 |
| 3,077,613 | A | * | 2/1963 | Mayer .................. A61G 7/0533 212/179 |
| D197,683 | S | * | 3/1964 | Kusel ............................ D99/32 |
| 4,065,085 | A | * | 12/1977 | Gellatly .................. A47J 33/00 126/30 |
| D251,944 | S | * | 5/1979 | Chasen .......................... D6/556 |
| 4,187,978 | A | * | 2/1980 | Dowker ............. A47G 29/1216 232/39 |
| 4,759,161 | A | * | 7/1988 | Kucyk, Jr. .............. E01F 9/635 404/10 |
| 4,856,423 | A | * | 8/1989 | Burns .................... A47J 33/00 99/421 H |
| 4,896,651 | A | * | 1/1990 | Kott, Jr. ................. F24B 1/205 126/30 |
| 4,991,344 | A | | 2/1991 | Carney |
| D338,765 | S | * | 8/1993 | Hohlbein ........................ 232/38 |
| D348,632 | S | * | 7/1994 | Hollinger ...................... D30/124 |
| 5,458,428 | A | * | 10/1995 | West .................. A47G 29/1216 403/252 |
| 5,463,974 | A | * | 11/1995 | Seeder ...................... G09F 7/18 116/173 |
| 5,487,476 | A | | 1/1996 | Barfield |
| D371,507 | S | * | 7/1996 | Hollinger ...................... D11/148 |
| 5,713,514 | A | * | 2/1998 | Eck .................... A47G 29/1216 232/17 |
| 5,806,758 | A | * | 9/1998 | Erwin ................ A47G 29/1216 232/39 |
| 5,873,195 | A | | 2/1999 | Wortham |
| 5,934,014 | A | | 8/1999 | Carrothers |
| 5,944,009 | A | * | 8/1999 | Scheller .................. A47J 33/00 126/25 R |
| 6,303,195 | B1 | * | 10/2001 | Reynolds ............. A47B 96/061 248/207 |
| 6,520,665 | B1 | | 2/2003 | Scandle |
| 6,557,806 | B2 | | 5/2003 | Davies |
| 6,575,423 | B2 | * | 6/2003 | Erwin ................ A47G 29/1216 248/121 |
| 6,578,568 | B1 | * | 6/2003 | Dufort .................... F24B 1/205 126/25 A |
| 6,584,967 | B1 | * | 7/2003 | Paumen .................. A47J 33/00 126/25 AA |
| 7,089,694 | B2 | * | 8/2006 | Allen .................. G09F 15/0037 173/126 |
| 7,172,163 | B1 | * | 2/2007 | Johnson ............. A47G 29/1216 232/39 |
| 7,249,910 | B2 | * | 7/2007 | Eckert ...................... E01F 9/685 248/158 |
| D553,966 | S | * | 10/2007 | Triay ............................ D8/363 |
| D561,571 | S | * | 2/2008 | Houghland .................... D8/381 |
| 7,389,603 | B1 | * | 6/2008 | Brumfield ................ A45F 3/44 173/91 |
| 7,740,216 | B1 | | 6/2010 | Puckett et al. |
| 7,980,520 | B2 | * | 7/2011 | Taylor ...................... A45F 3/44 248/156 |
| 8,104,734 | B2 | * | 1/2012 | Stover .................... E04H 17/24 248/218.4 |
| 8,177,185 | B2 | * | 5/2012 | Priegel .................... G09F 17/00 135/16 |
| 8,938,900 | B1 | * | 1/2015 | Halle ........................ A45F 3/44 248/508 |
| 8,950,723 | B1 | * | 2/2015 | Fogelstrom ............ A45B 11/00 135/16 |
| 8,955,808 | B2 | | 2/2015 | Buschbach |
| 9,390,640 | B1 | * | 7/2016 | Coleman ............. E04H 12/2215 |
| 2003/0173474 | A1 | | 9/2003 | Taylor |
| 2007/0101645 | A1 | | 5/2007 | Christopher et al. |
| 2007/0108363 | A1 | * | 5/2007 | Metheny ................ A45B 11/00 248/539 |
| 2010/0108834 | A1 | * | 5/2010 | Rigas .................. A47G 25/0685 248/213.1 |
| 2010/0243975 | A1 | | 9/2010 | Stover |
| 2011/0308990 | A1 | * | 12/2011 | Pounders ............. E04H 12/2215 206/525 |
| 2012/0144654 | A1 | | 6/2012 | Christian et al. |
| 2015/0020362 | A1 | * | 1/2015 | Irwin .................... G09F 17/00 29/428 |

* cited by examiner

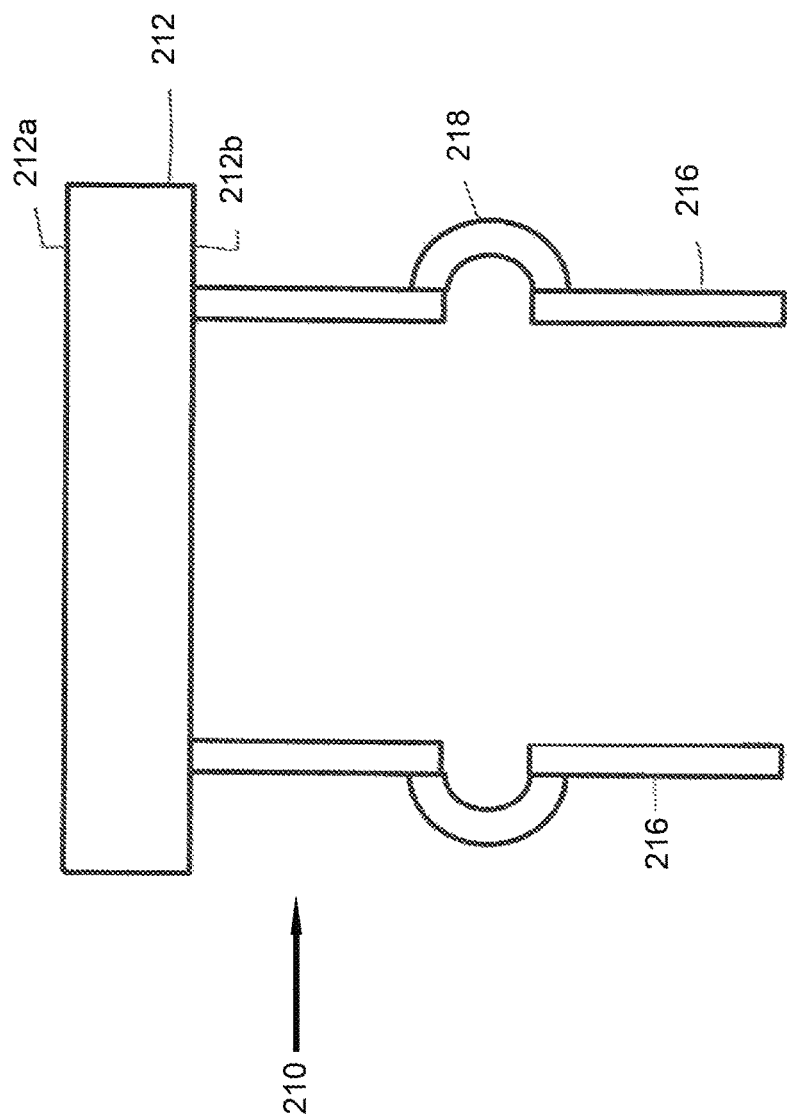

RAIL POST VERTICAL EXTENSION SYSTEM

REFERENCE TO RELATED APPLICATIONS

This application is a continuation-in-part of U.S. application Ser. No. 14/985,409 filed Dec. 31, 2015, now abandoned, which is entirely incorporated by reference.

FIELD OF THE INVENTION

The present invention relates generally to the field of mounting/support device and for mounting items upon erected fence structures, and more specifically relates to a rail post mounting system for mounting articles, such as ornamental plant hangers, upon a hollow fence post.

DESCRIPTION OF RELATED ART

Patio and deck railings and even fence railings are functional installations intended to define the boundaries of an entertainment area or land limit. As functional installations, in addition to providing definition, they may also perform supporting functions such as providing strength for the railing structure. In general terms, patio, deck, and fence railing aesthetics are simple and may be void of decoration. To enhance the appearance of railing installations, items such as flag poles and planters are often added-on afterward to provide some visual interest and customization. These add-ons can appear to be haphazardly placed and may differ in appearance from the railings because they are made by companies other than the rail manufacturer. They also may have characteristics such as support members that may extend to, and are secured into, the deck or patio floor surface, which may inadvertently introduce tripping hazards in to the space. Rail add-ons attempt to tap into the structural strength of the rail installations but are not integrated in to the overall structure and, therefore, are subject to misalignment and installation failure.

Several attempts have been made to solve the above-mentioned problems such as those found in U.S. Pub. Nos. 2003/0173474 to Taylor; 2007/0101645 to Christopher et al; 2010/0243975 to Stover; 2012/0144654 to Christian et. al., U.S. Pat. No. 4,991,344 to Carney; U.S. Pat. No. 5,487,476 to Barfield; U.S. Pat. No. 5,873,195 to Wortham; U.S. Pat. No. 5,934,014 to Carrothers; U.S. Pat. No. 6,520,665 to Scandle; U.S. Pat. No. 6,557,806 to Davies; U.S. Pat. No. 7,740,216 to Puckett et. al.; and U.S. Pat. No. 8,955,808 to Buschbach. This art is representative of rail mounted ornamental plant hangers. However, none of the above inventions and patents, taken either singly or in combination, is seen to describe the invention as claimed.

Recently, fencing constructions often utilize materials, such as metals and plastics, wherein the post and rail members are typically formed having a hollow configuration, such as rectangular, triangular or circular in their cross section, wherein the open top of a post is covered and sealed with a cap.

While prior art fence post support devices have been designed for mounting or hanging of articles in connection with standing fence posts, including those of hollow configuration, the structural features of these prior art devices have been somewhat complicated in their fitted coupling to the fence post and have been specifically designed to fit those standing fence posts that are erected alongside of the intermediate fencing material.

U.S. Pat. No. 8,104,734, discloses a fence post mounting device for supporting accessory articles upon a hollow fence post. The device comprises a cap member sized to fit over and upon the open top of the hollow fence post as a cover therefor, an elongated shaft member attached to the inside of the cap member and extending lengthwise therefrom to engage the chamber of the post, and support means coupled to the top of the cap member for holding or hanging the decorative accessories. This reference discloses a shaft member fabricated having a pair of flanges formed on opposite sides of an intermediate web to provide a substantially "H" transverse cross section designed to fit closely within the chamber of a rectangular fence post. This patent also discloses an alternative shaft member having a pair of contiguous side walls providing a substantially "L" transverse cross section for a corner posts. The mounting device of this patent requires the cap and the shaft to be sized precisely to achieve an effective fitted engagement with the hollow fence posts.

There is still a need for a fence post mounting device that would reliably and effectively allow mounting or hanging of accessory items upon a hollow fence post member, would be easy to manufacture, and be manufactured at a modest expense.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In view of the foregoing disadvantages inherent in the known fence post mounting devices the present invention provides a novel rail post mounting device and vertical extension system. The general purpose of the present invention, which will be described subsequently in greater detail, is to provide a structurally sturdy assembly for mounting accessory items in hollow fence; rail posts.

In accordance with an aspect of the present invention, there is provided a mounting device for mounting one or more accessory items over a hollow fence post defining a chamber, which comprises a cover member having a top surface configured to hold the one or more accessory items, and a bottom surface configured to engage the top of the hollow fence post; and an elongated insert member attached to the bottom surface of the cover member, which is configured for insertion into the post chamber, the elongated insert member comprising a plurality of resilient retention arms configured to extend toward and pressingly engage with sidewalls of the post chamber.

In accordance with an aspect of the present invention, there is provided a mounting device for mounting one or more accessory items over a hollow fence post defining a chamber, which comprises a cover member having a top surface configured to hold the one or more accessory items, and a bottom surface configured to engage the top of the hollow fence post, and elongated insert member attached to the bottom surface of the cover member and configured for insertion into the post chamber. The elongated insert member comprises a plurality of resilient retention arms attached to and extending generally downward from the bottom surface of the cover member, and wherein at least the end portions of the retention arms are angled outward relative to a longitudinal axis of the device, such that each adjacent pair of retention arms is separated by a respective gap, and the retention arms are resiliently deformable along at least a portion of their lengths, such that at least two selected arms are capable of pressingly engage respective inner sidewalls of the post chamber. Preferably the outward angle is 5 degrees or more, more preferably 10 degrees or more, more preferably 15 degrees or more, more preferably 20 degrees or more, and more preferably 25 degrees or more. In one aspect of this embodiment, all of the retention arms are configured to engage respective inner sidewalls of the post chamber.

The present invention holds significant improvements and serves as a structurally sturdy assembly to support or hang items, such as plants from a deck or fence rail. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention. The present disclosure will be better understood when read in connection with the following drawings.

FIG. 5 illustrates a side view of the mounting device in accordance with another embodiment of the present invention.

Various embodiments of the present invention will hereinafter be described in conjunction with the appended drawings, wherein like designations denote like elements.

DETAILED DESCRIPTION

Figure 1B:
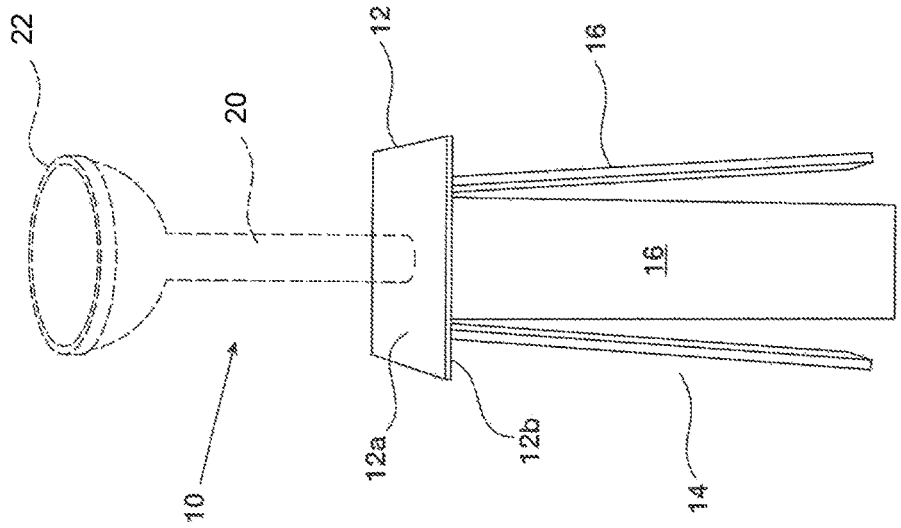
FIG. 1B illustrates a side of the mounting device in accordance with the embodiment of FIG. 1 A.

The present invention provides an improved fence post mounting device/vertical extension system, which is simple to use and easy to manufacture, and provides structurally sturdy assembly for holding and/or hanging accessory items such as plant holders.

Generally speaking, the mounting device of the present invention comprises a cover member having a top surface configured to hold the one or more accessory items and a bottom surface configured to engage the top of the hollow fence post, and an elongated insert member attached to the bottom surface of the cover member, which is configured for insertion into the post chamber. The elongated insert member comprises a plurality of resilient retention arms configured to extend toward and pressingly engage with the sidewalls of the post chamber.

In some embodiments, the retention member is defined by the retention arms attached to, and extending longitudinally/ downward from the bottom surface of the cover member. In some embodiments, at least the end portions of the retention arms are angled outward relative to a longitudinal axis of the device, such that each adjacent pair of retention arms is separated by a respective gap, and the retention arms are resiliently deformable along at least a portion of their lengths, such that at least two selected retention arms are capable of pressingly engage respective inner sidewalls of the post chamber. In some embodiments all of the retention arms pressingly engage respective inner sidewalls of the post chamber.

In some embodiments, the entirety of the retention arms are angled outward, and the gap between said each pair of adjacent arms increases with distance from the cover.

In some embodiments, the retention member is defined by the retention arms attached to, and extending longitudinally/ downward from the bottom surface of the cover member, wherein the retention arms comprise one or more bulges configured to extend toward and pressingly engage with the sidewalls of the post member. In some embodiments, at least the end portions of the retention arms are angled outward relative to a longitudinal axis of the device, such that each adjacent pair of retention arms is separated by a respective gap.

In some embodiments, the elongated insert member comprises a rigid body for insertion into the post chamber, and wherein the retention arms are connect to the rigid body and extend outward toward the inner sidewalls of the post member. In some embodiments, the retention arms extend from the rigid body at an outward and downward angle. In some embodiments, the retention arms extend from the rigid body at an outward and downward angle. The retention arms are resiliently deformable along at least a portion of their lengths, such that at least two selected retention arms are capable of pressingly engage respective inner sidewalls of the chamber of post member. In some embodiments all of the retention arms are capable of pressingly engage respective inner sidewalls of the chamber of post member.

In some embodiments, the insertion member comprises the retention arms attached to a region between the center and the peripheral edge of the cover member.

In some embodiments, the retention arms are substantially flat having an inner surface and an outer surface, wherein the outer surface engages the respective inner side wall of the post chamber.

In some embodiments, the mounting device of the present invention is for a fence post having quadrilateral configuration. In such embodiments, at least two retention arms are disposed to engage opposite side walls of the post chamber. In some embodiments, the device comprises four retention arms disposed in a substantially quadrilateral configuration to engage respective side walls of the chamber. In some embodiments, the device is for a square or a rectangular fence post.

In some embodiments, the mounting device of the present invention is for a fence post having triangular configuration, and can have three retention arms disposed in substantially triangular configuration to engage respective side walls of the triangular post chamber.

In some embodiments, the mounting device of the present invention is for a fence post having a circular cross section, and comprises at least two curved retention arms disposed to engage inner wall of the chamber The length of the insert member and/or the retention arms, and theft projection within the post chamber can be varied according to the size and weight of the accessory articles intended for support upon the fence post.

In some embodiments, the retention arms, at least in the deformable portions thereof, may be substantially flat and formed of a resiliently deformable material such as spring steel.

In some embodiments, the mounting device comprises a support member attached to the top surface of the cover. The support member can be configured and sized to support and/or hold different types of items/articles.

In some embodiments, the support member comprises an extension member/shaft attached to the upper surface of the cover member and is configured to hold one or more articles. In some embodiments, the extension member comprises one or more receiving arms extending therefrom, which may further have connection members such as hooks. In some embodiments, the extension member is a rod further comprising one or more receptacles at free end thereof.

The extension member can be a rigid, or a hollow member. In some embodiments, the extension member is rod member. The hollow extension member may further comprise a cap member.

The length of the extension member can be varied according to the length of the underlying fence post, the article/items intended to be mounted thereon, and the elevation desired for the mounted items/articles.

In some embodiments, the support member comprises one or more receptacles such as a plate, a tray, a cup, etc. to hold an article, such as flower pot, candles, etc.

In some embodiments, the cover member is sized to match the open end of the post. In some embodiments, the cover member is sized to hang over the edges of the open end of the post.

In some embodiments, the cover member may further comprise side walls to form a cap configured to fit over open end of the fence post.

In the mounting device of the present invention, the lengths of the retention arms, the deformability, and/or the outward angle of the retention arms, are cooperatively configured such that the arms can be deformed inward (e.g. manually) to fit within an chamber defined by a hollow fence post and the insert member is pressed into the chamber until the cover member abuts the top of the fence post. Meanwhile the retention arms deflect outward due to their resilience to pressingly engage the inner sidewalls of the chamber, thereby holding the device/system in place.

The mounting device may be removably inserted in a deck or fence rail by anyone who has a deck or fence rail post and would like to alter the appearance of the deck boundary or fence by inserting the insert member into a hollow post such that the cover member covers the top of the hollow post, and the support member is available for supporting at least one retainable object, such as a plant holder, wind screen, bug screen, sun shade, animal feeder, light, a flag, or the like. The mounting device may be inserted and removed with little effort.

The mounting system may be inserted and removed with minimal effort. A plurality of items may be interchangeably hung on the receiving arm(s). Items such as beverage ice buckets, shelves to hold lamps or decorative items, racks to hold or arrange barbeque accessories, or music and television speaker systems may be affixed to the base support end. The present invention is for use in hanging or otherwise supporting a host of items and accessories. The items listed are examples and are not intended to limit the scope of the invention in any way, but simply provide exemplary means for carrying out use of the present invention. The mounting device/rail post extension system may be ideal for anyone who has a deck or fence rail post and would like to alter the appearance of the deck boundary or fence by suspending plants in a decorative and structurally sturdy manner Some of the newer post/railing designs have 4 holed sections in the corners and the present invention as such may comprise an insert design to accommodate this structure.

In accordance with another embodiment of the present invention, there is provide a kit comprising a plurality of the mounting devices and at least one set of user instructions. The kit has instructions such that functional relationships are detailed in relation to the structure of the invention (such that the invention can be used, maintained, or the like in a preferred manner).

As discussed above, the mounting device may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The device of the present invention can be made from any suitable material such as steel, aluminium, plastic, etc.

Figure 1A:
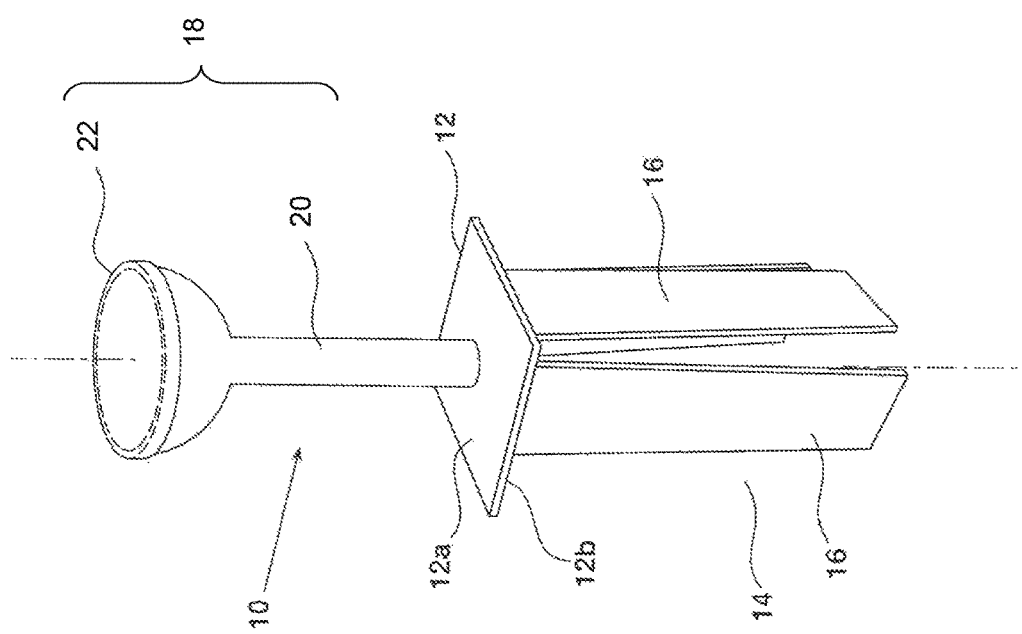
FIG. 1A illustrates a perspective view of the mounting device in accordance with an embodiment of the present invention.

FIG. 1A, illustrates a perspective view a mounting device 10 according to an embodiment of the present invention, which is configured for a square hollow fence post. The device 10 comprises a cap member 12 having a top surface 12a and a bottom surface 12b, an elongated insert member 14 defined by four space apart retention arms 16, extending from the bottom surface of the cover member, and a support member 18 comprising an extension member 20 attached to the top surface, and a receptacle 22 at its free end. The insert retention arms 16 are angled outwardly relative to longitudinal axis x-x of the device. FIG. 1B illustrates another perspective view of the device of FIG. 1 showing optional support member.

Figure 2:
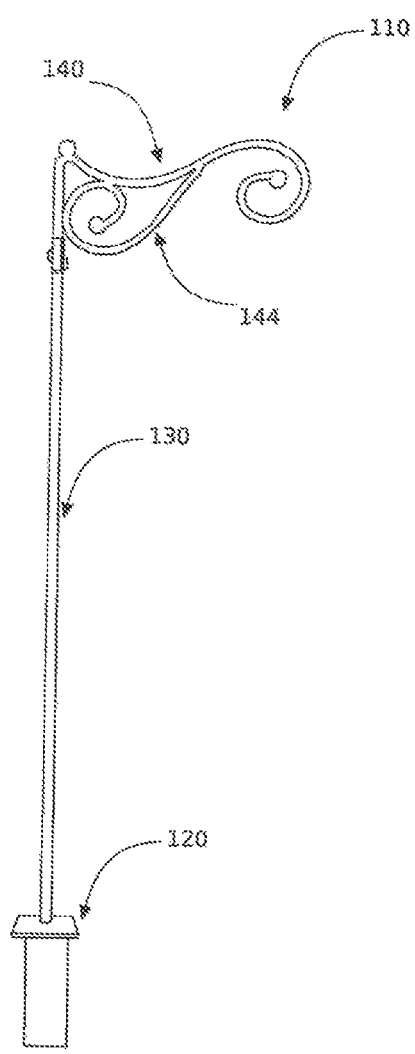
FIG. 2 illustrates a perspective view of the mounting device in accordance with another embodiment of the present.

FIG. 2 illustrates a perspective view of a mounting device 110 according to another embodiment of the present invention. The mounting device 110 comprises a cover member 120, an insert member 124, and a support member comprising an extension member/rod 130 and at least one receiving arm 140 to receive at least one retainable object. The receiving arm further comprises a gusset member 144 for reducing load stress increasing load bearing capability of objects.

Additional arm receiver configurations may be used in alternate embodiments of the present invention.

Figure 3:
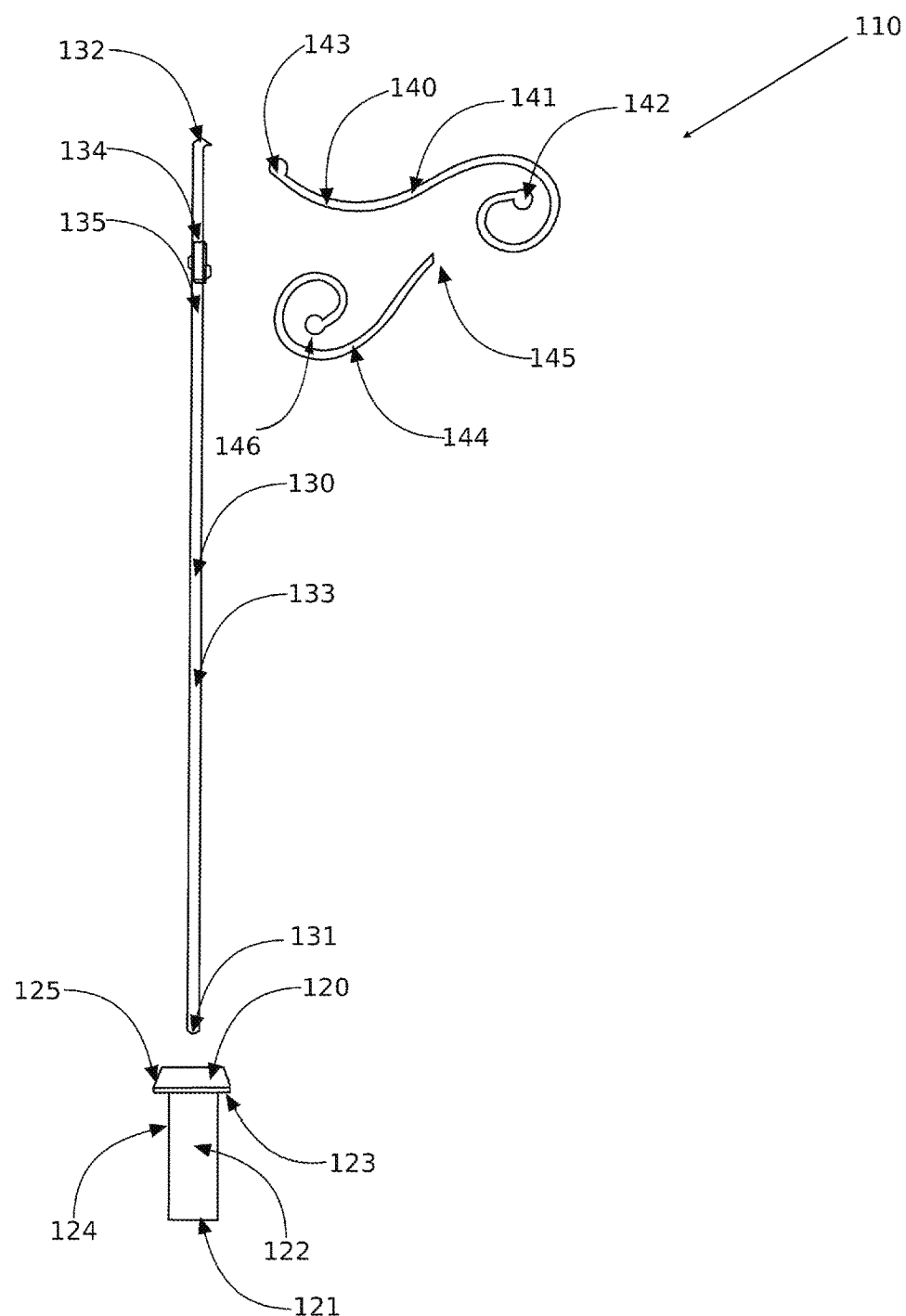
FIG. 3 illustrates an exploded perspective view of the mounting device in accordance with the embodiment of FIG. 2.

Referring now to FIG. 3, which depicts an exploded view of FIG. 2 illustrating the mounting device 110 comprising a cover member 120 having a bottom surface 123 and a top surface 125, an insert member 124 extending from the bottom surface (showing the front view of one of the retention arms 122), and having a free-end 121, wherein the insert member is removably insertable into square tubing posts, deck rails or fence rails. The mounting device 110 further comprises an extension member/rod 130 comprising bottom-end 131, top-end 132, length 133 mid-point 135, and upper segment 134. Bottom-end 131 of rod 130 is integrally joined to the top surface 125 of the cover member 120.

In continuing to refer to FIG. 3, showing at least one receiving arm 140 comprising horizontal arm length 141 distal-end 142 proximal-end 143 and at least one gusseted member 144 comprising first-end 145 and second-end 146. Further, proximal-end 143 of at least one receiving arm 140 is fixedly joined to top-end 132 of rod 130, and at least one gusseted member 144 is fixedly joined to upper-segment 134 of length 133 of rod 130 below top-end 132 and mid-point 135 of horizontal arm length 141.

Figure 4A:
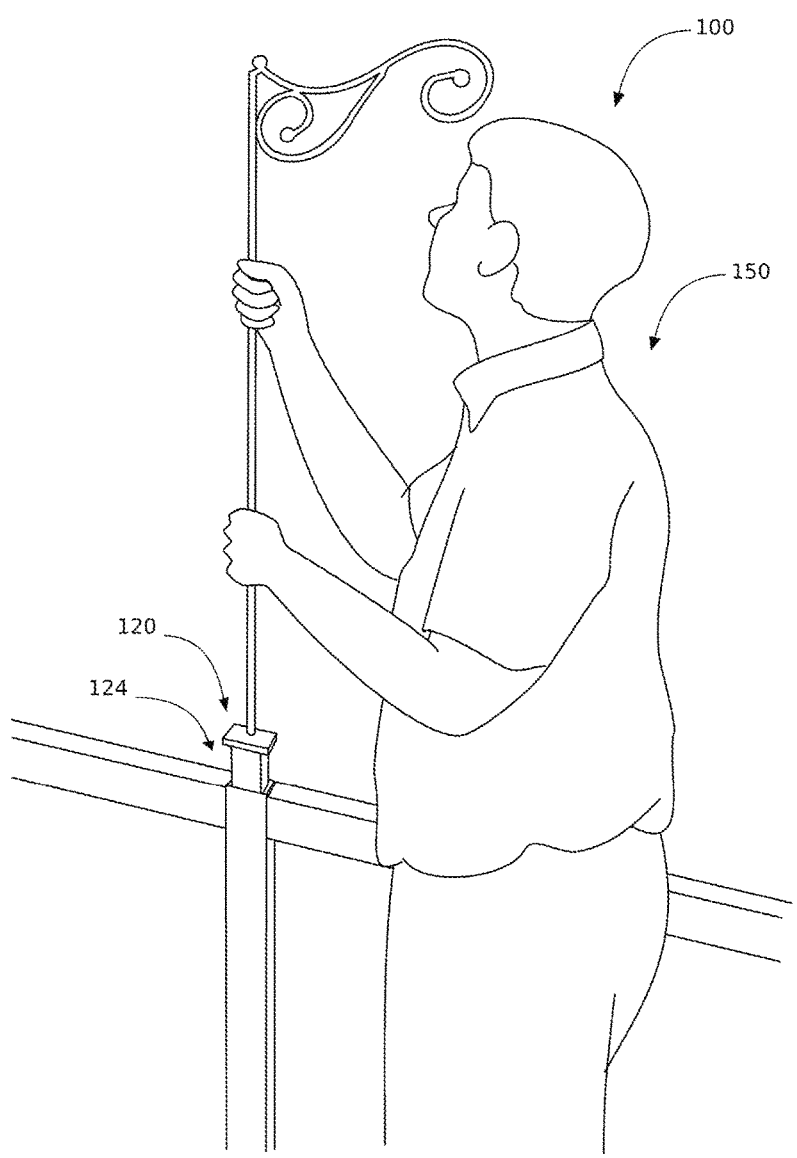
FIG. 4A illustrates a perspective view of the mounting device of FIG. 2 during an 'in-use' condition.

FIG. 4A illustrates a perspective view of the mounting device 110 of FIG. 2 during an "in-use" condition wherein user 150 may removably insert the insert member 124 into top of hollow rail post.

Figure 4B:
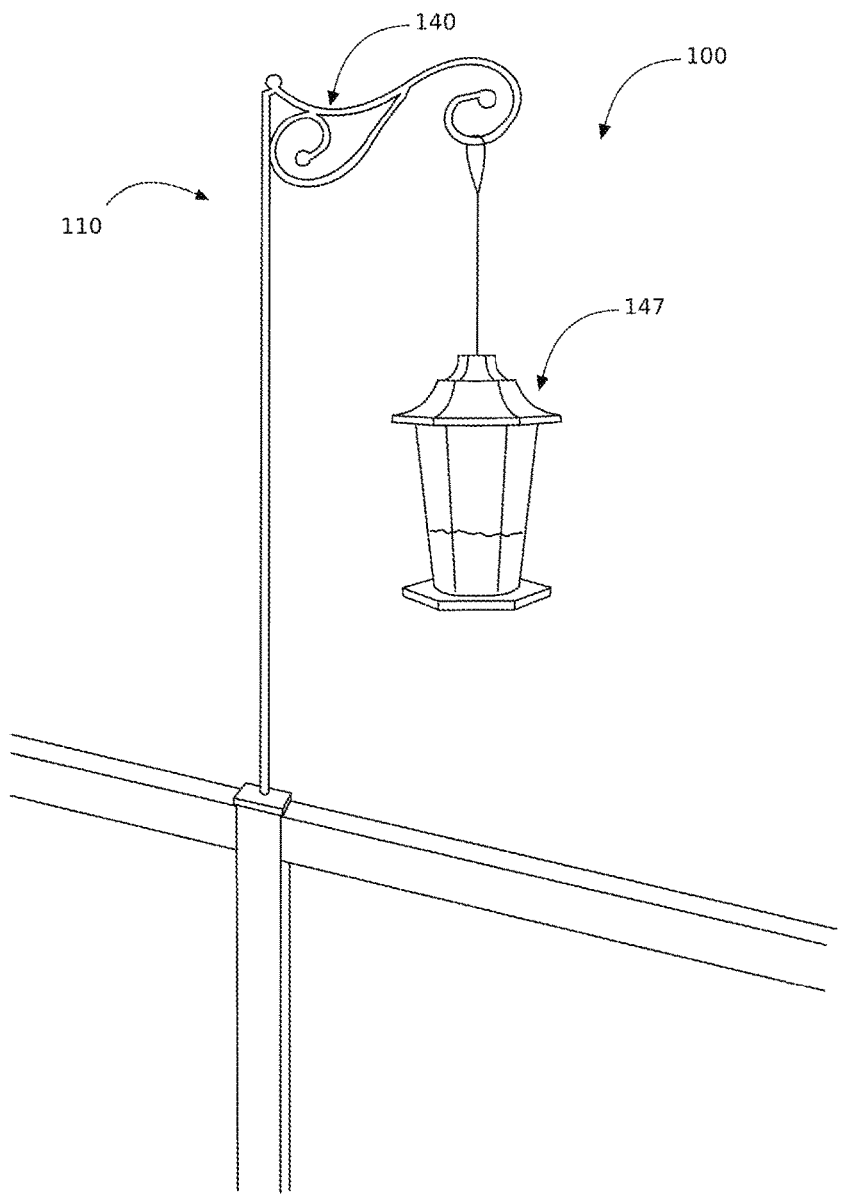
FIG. 4B illustrates a perspective view illustrating the mounting device according to FIG. 2 in a rail post vertical extension system.

FIG. 4B, a perspective view illustrating rail post vertical extension system 100 comprising the mounting device 110 of FIG. 2 in use, wherein at least one receiving arm 140 comprises at least one retainable object such as animal feeder 147.

FIG. 5 illustrates a side view of a mounting device 210 according to another embodiment of the present invention, which comprises a cap member 212 having a top surface 212a and a bottom surface 212b, an elongated insert member 214 comprising at least two flat retention arms 216, extending from the bottom surface of the cover member, which are optionally angled outwardly relative to longitudinal axis of the device. Each one of the retention arms have a bulge/protuberance configured to extend toward and pressingly engage with sidewalls of a post chamber.

Figure 6:
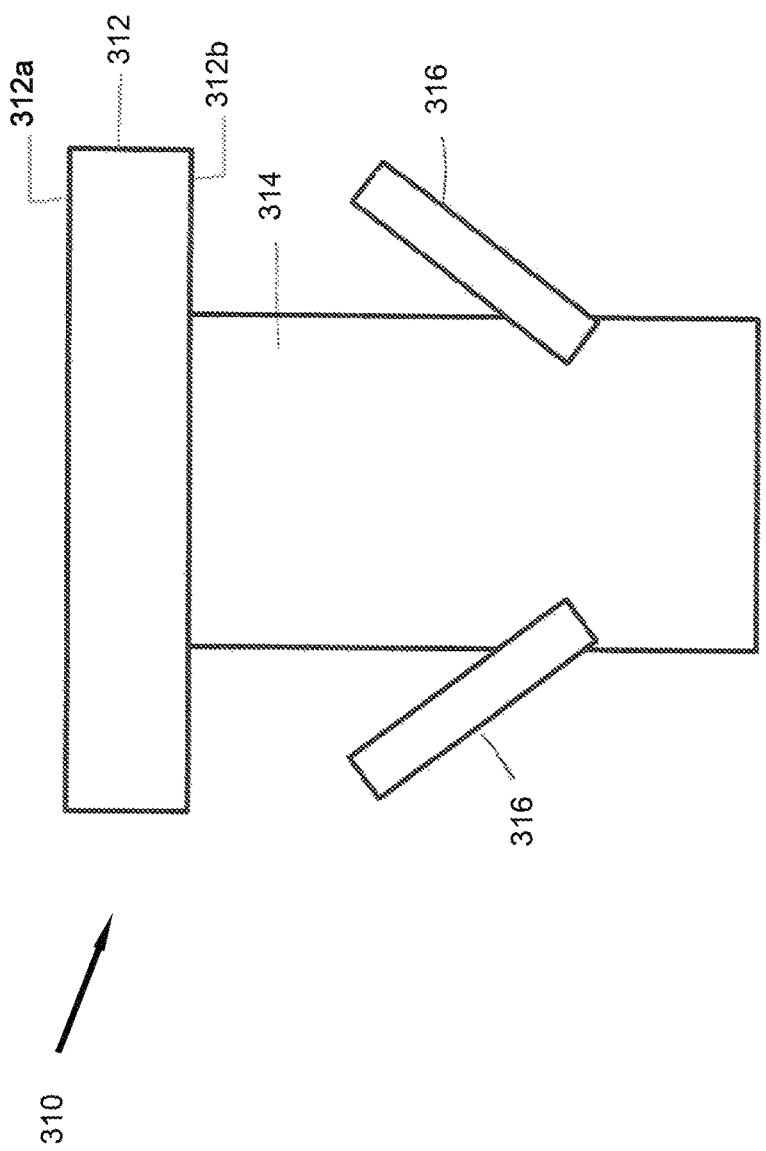
FIG. 6 illustrates a side view of the mounting device in accordance with another embodiment of the present invention.

FIG. 6 illustrates a side view of a mounting device 310 according to another embodiment of the present invention, which comprises a cap member 312 having a top surface 312a and a bottom surface 312b, an elongated insert member 214 having a rigid body which extends from the bottom surface of the cover member. At least two retention arms 316 resiliently attached to the sides of the rigid body, such that they extend outward toward the sidewalls of the post chamber.

Figure 7:
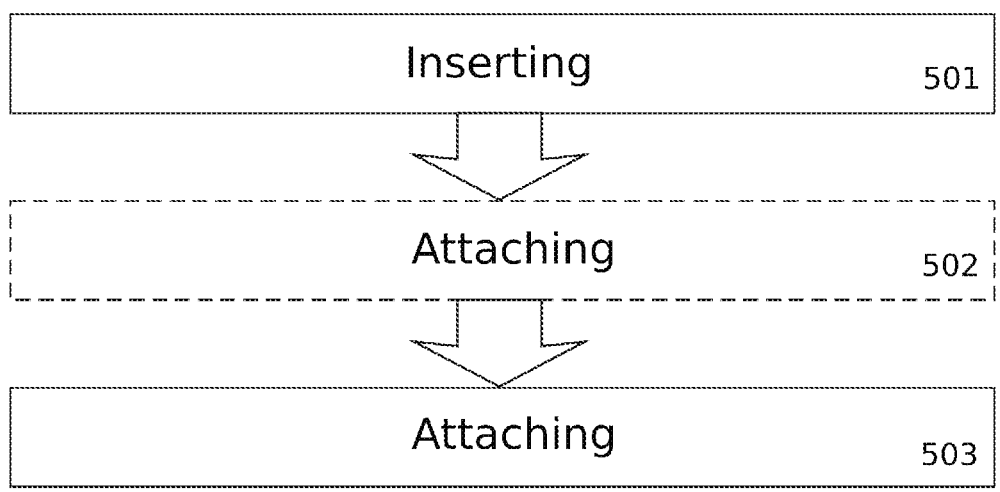
FIG. 7 illustrates a flowchart illustrating a method of use for the mounting device according to an embodiment of the present invention.

Referring now to FIG. 7 showing flowchart 550 illustrating method of use 500 for the mounting device according to an embodiment of the present invention. As shown, method of use 500 may comprise the steps of: step one 501, inserting base support end 120, step two 502, attaching hook receivers, and step three 503, attaching arm receivers 140.

It should be noted that step 502 is an optional step and may not be implemented in all cases. Optional steps of method of use 500 are illustrated using dotted lines in FIG. 7 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. .sctn.112, 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Although the present invention has been described with reference to specific features and embodiments thereof, it is evident that various modifications and combinations can be made thereto without departing from the invention. The provided specification is, accordingly, to be regarded simply as an illustration of the invention as defined by the appended claims, and are contemplated to cover any and all modifications, variations, combinations or equivalents that fall within the scope of the present invention.

I claim:

1. A mounting device for mounting one or more accessory items over a hollow support post defining a chamber, the device comprising:
   a cover member having a top surface configured to hold the one or more accessory items, and a bottom surface configured to engage the top of the hollow support post;
   an elongated insert member attached to the bottom surface of the cover member and configured for insertion into the chamber,
   wherein the elongated insert member comprises a plurality of resilient retention arms attached to and extending generally downward from the bottom surface of the cover member, each arm having an inner surface and an outer surface;
   wherein the retention arms are angled outward relative to a longitudinal axis of the device, such that the outer surfaces of the arms are angled downward and outward relative to the longitudinal axis, and each adjacent pair of retention arms is separated by a respective gap, and
   wherein the retention arms are resiliently deformable along at least a portion of their lengths, such that the outer surface of each retention arm is capable of pressingly engaging respective inner sidewall of the chamber.

2. The device of claim 1, further comprising a support member attached to the top surface of the cover member for holding the one or more accessory items.

3. The device of claim 1, wherein the retention arms are attached to a region between a center and a peripheral edge of the cover member.

4. The device of claim 1, wherein the retention arms are substantially flat.

5. The device of claim 1, wherein the device is for a quadrilateral support post and the plurality of retention arms consists of four retention arms disposed in a substantially quadrilateral configuration to engage respective inner side walls of the post chamber.

6. The device of claim 5, wherein the quadrilateral support post is square or rectangular.

7. The device of claim 1, wherein the device is for a triangular support post, and the plurality of retention arms consists of three retention arms disposed in substantially triangular configuration to engage respective inner side walls of the post chamber.

8. The device of claim 2, wherein the support member comprises an extension member attached to and extending from the upper surface of the cover member and configured to hold the one or more accessory items.

9. The device of claim 8, wherein the extension member further comprises one or more receiving arms extending outwardly therefrom, for holding the one or more accessory items.

10. The device of claim 9, wherein the one or more receiving arms comprise a receptacle at a free end thereof to hold the one or more accessory items.

\* \* \* \* \*